US012329277B2

(12) United States Patent
Daniel

(10) Patent No.: US 12,329,277 B2
(45) Date of Patent: Jun. 17, 2025

(54) DIVIDED DESKTOP ORGANIZER

(71) Applicant: Tombow Pencil Co., Ltd., Tokyo (JP)

(72) Inventor: Ruby Catherine Daniel, Cumming, GA (US)

(73) Assignee: TOMBOW PENCIL CO., LTD., Tokyo (JP)

( * ) Notice: Subject to any disclaimer, the term of this patent is extended or adjusted under 35 U.S.C. 154(b) by 622 days.

(21) Appl. No.: 17/695,490

(22) Filed: Mar. 15, 2022

(65) Prior Publication Data

US 2022/0288964 A1 Sep. 15, 2022

Related U.S. Application Data

(60) Provisional application No. 63/161,319, filed on Mar. 15, 2021.

(51) Int. Cl.
*A47B 67/04* (2006.01)
*B42F 7/12* (2006.01)

(52) U.S. Cl.
CPC ................ *A47B 67/04* (2013.01); *B42F 7/12* (2013.01)

(58) Field of Classification Search
CPC ....... A47B 67/04; A47B 88/473; A47B 88/44; A47B 88/70; A47B 88/75; A47B 2088/76; A47B 88/477; B42F 7/12; B43M 99/008; B43M 99/007
USPC ......... 312/9.48, 330.1, 126, 128, 239, 348.3
See application file for complete search history.

(56) References Cited

U.S. PATENT DOCUMENTS

| | | | | | |
|---|---|---|---|---|---|
| 635,962 | A * | 10/1899 | Henley | A47B 88/90 312/273 |
| 4,988,214 | A * | 1/1991 | Clement | A47B 88/493 312/333 |
| 5,399,006 | A * | 3/1995 | Murazumi | A61B 50/10 312/109 |
| 6,042,204 | A | 3/2000 | Quirch | |
| 6,278,677 | B1 * | 8/2001 | Sako | G11B 17/225 |
| 10,551,113 | B1 * | 2/2020 | Wantland | A47B 88/49 |
| 2006/0218958 | A1 * | 10/2006 | Rand | F25D 11/022 62/302 |
| 2011/0006019 | A1 * | 1/2011 | Vivas | B42F 7/12 211/11 |

(Continued)

FOREIGN PATENT DOCUMENTS

| | | | | |
|---|---|---|---|---|
| CN | 1590229 A * | 3/2005 | A47B 88/477 |
| CN | 204367624 U | 6/2015 | |

(Continued)

OTHER PUBLICATIONS

KR_0134996 translation (Year: 1999).*

*Primary Examiner* — Hiwot E Tefera
(74) *Attorney, Agent, or Firm* — Kolitch Romano Dascenzo Gates LLC

(57) ABSTRACT

A desktop organizer may include: a housing and a plurality of drawers received by the housing, the drawers being interlocked by paired slots extending from bottom faces of the drawers and fins extending vertically from top faces of the drawers. In some examples, the fins may extend vertically from dividers extending from a front edge to a back edge of the drawers, which may separate the drawers into compartments configured to hold and display elongate writing objects. The slots may be longer than a distance between the fins, such that the drawers are staggered when withdrawn from the housing.

20 Claims, 15 Drawing Sheets

(56) References Cited

U.S. PATENT DOCUMENTS

| | | | | |
|---|---|---|---|---|
| 2011/0121695 | A1* | 5/2011 | Purdy | E05B 65/462<br>312/244 |
| 2016/0178274 | A1* | 6/2016 | Shin | F25D 25/025<br>312/408 |
| 2016/0209107 | A1* | 7/2016 | Choi | F25D 25/025 |
| 2017/0086584 | A1* | 3/2017 | Rehage | A47B 88/473 |
| 2018/0049562 | A1* | 2/2018 | Rosner | A47F 5/0025 |

FOREIGN PATENT DOCUMENTS

| | | | | |
|---|---|---|---|---|
| CN | 107816176 | A | * | 3/2018 |
| CN | 212446887 | U | | 2/2021 |
| CN | 213704976 | U | | 7/2021 |
| DE | 206910 | C2 | | 7/1984 |
| JP | 58153700 | A | | 9/1983 |
| JP | 2016039875 | A | * | 3/2016 |
| KR | 0134996 | Y1 | * | 2/1999 |

* cited by examiner

DIVIDED DESKTOP ORGANIZER

CROSS-REFERENCES

The following applications and materials are incorporated herein, in their entireties, for all purposes: U.S. Provisional Patent Application Ser. No. 63/161,319, filed Mar. 15, 2021.

FIELD

This disclosure relates to systems and methods for storing, organizing, and retrieving elongate items. More specifically, the disclosed embodiments relate to desktop organizer devices for fine writing and drawing instruments, such as fine art pens, markers, and the like.

INTRODUCTION

Artists, both professional and amateur, enjoy using fine writing and drawing instruments, such as markers, pens, paint brushes, and pencils. Often, many such instruments are needed for a project, and easy selection and access to the various colors and shades of pen, for example, can become cumbersome or awkward. Collections of similar items become jumbled and disorganized. Various organizers have been developed over the years, all with varying levels of advantage and disadvantage.

SUMMARY

The present disclosure provides systems, apparatuses, and methods relating to divided desktop organizers.

A desktop storage organizer in accordance with aspects of the present disclosure may include: a housing having an open face; and a plurality of drawers disposed within the housing, each drawer comprising an expanse having a top face and an opposing bottom face; wherein, for each of the drawers, the top face includes a front-facing abutment surface spaced from a rear-facing abutment surface and the bottom face includes a rear-facing bumper spaced from a front-facing bumper, such that the rear-facing bumper is disposed forward of a midline of the expanse and the front-facing bumper is disposed rearward of the midline; wherein the plurality of drawers are interlocked by the bumpers and abutment surfaces, such that transitioning a lower one of the drawers from a stowed position to a deployed position is configured to automatically pull an adjacent upper one of the drawers partially open due to interaction between the front-facing abutment surface of the lower drawer and the rear-facing bumper of the upper drawer.

A desktop storage organizer in accordance with aspects of the present disclosure may include: a plurality of drawers disposed in a housing; a first drawer of the plurality of drawers comprising a first divider oriented along a direction of travel of the drawer, the first divider having a front-facing abutment surface spaced apart from a rear-facing abutment surface, each of the abutment surfaces extending upward from the first divider; and a second drawer of the plurality of drawers comprising a first slot oriented along the direction of travel and configured to receive the abutment surfaces of the first divider, the first slot defining a rear-facing bumper spaced apart from a front-facing bumper, wherein the rear-facing bumper is disposed forward of a midline of the second drawer and the front-facing bumper is disposed rearward of the midline of the second drawer; wherein the first drawer and the second drawer are interlocked by the first divider and the first slot, such that transitioning the first drawer between a stowed and a deployed configuration along the direction of travel causes the second drawer to transition between a stowed and a deployed configuration; and wherein the rear-facing bumper is spaced from the front-facing abutment surface by an offset distance when the first drawer is stowed, such that the drawers are staggered by the offset distance when the first drawer is deployed.

A desktop storage organizer in accordance with aspects of the present disclosure may include: a housing; a first drawer received by the housing and including an expanse, wherein the first drawer is transitionable along a direction of travel between a stowed configuration and a deployed configuration in which the drawer is at least partially withdrawn from the housing; a first divider coupled to the expanse and oriented along the direction of travel, the first divider including a front fin and a rear fin each extending upward; and a second drawer received by the housing, the second drawer including a first slot having a front end and a rear end defining a length of the slot, the first slot oriented along the direction of travel and configured to receive the front and rear fins, such that the first drawer and the second drawer are interlocked; wherein the first and second drawer are configured such that transitioning the first drawer from the stowed configuration to the deployed configuration causes the front fin to contact the front end of the slot, automatically transitioning the second drawer to a deployed configuration.

Features, functions, and advantages may be achieved independently in various embodiments of the present disclosure, or may be combined in yet other embodiments, further details of which can be seen with reference to the following description and drawings.

DETAILED DESCRIPTION

Figure 1:
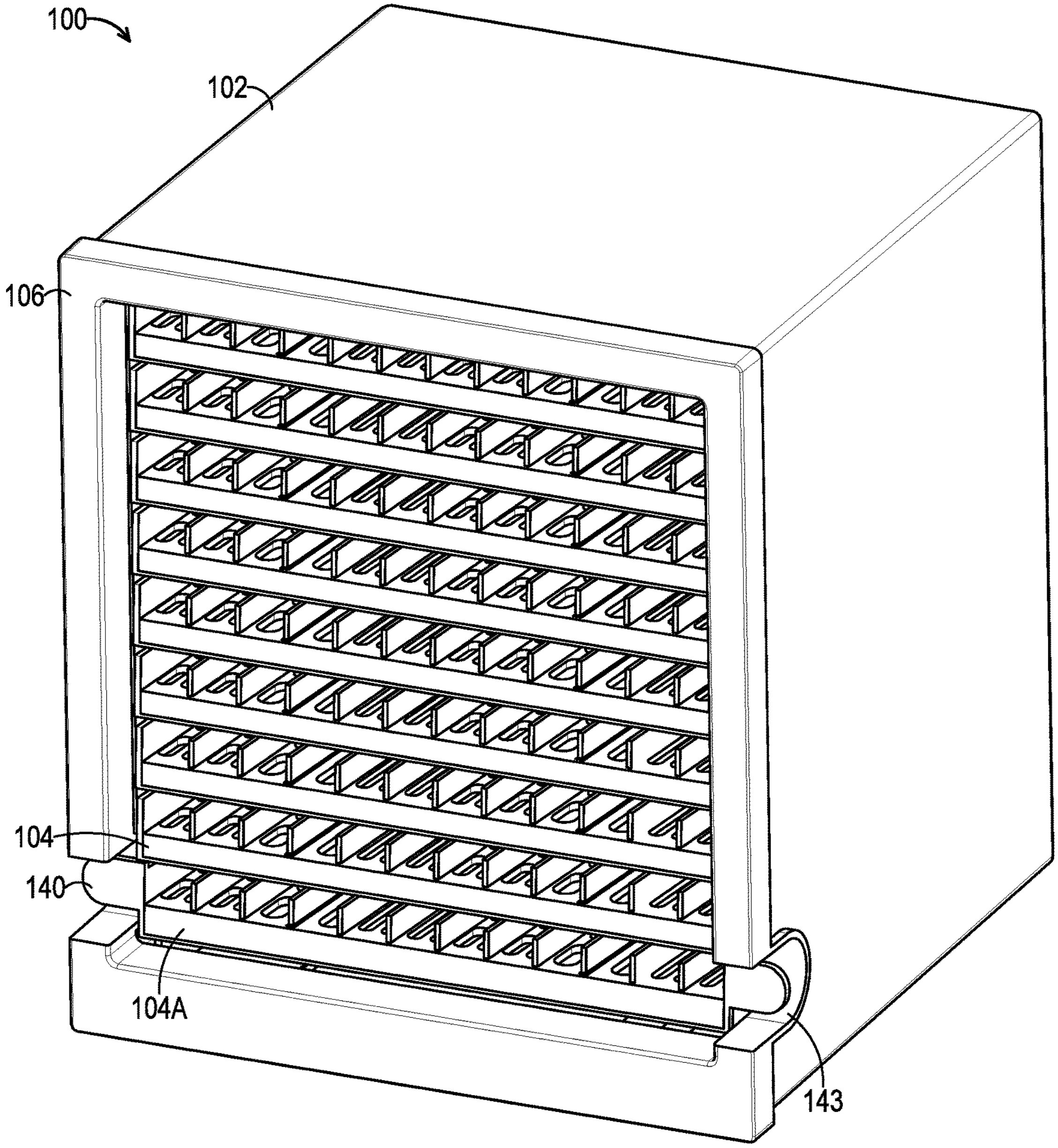
FIG. 1 is an isometric view of an illustrative desktop organizer in accordance with aspects of the present disclosure, depicted in a stowed configuration.

Various aspects and examples of a divided desktop organizer, as well as related methods, are described below and illustrated in the associated drawings. Unless otherwise specified, a divided desktop organizer in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a desktop organizer in accordance with the present teachings includes a plurality of pull-out shelves, racks, or drawers received by an open-faced case or housing. The plurality of drawers are transitionable between a stowed configuration, in which all of the drawers are contained within the housing, and a deployed configuration, in which at least some of the drawers are partially withdrawn from the housing (i.e., extending beyond the open face of the housing). Each drawer includes an expanse having a top face and an opposing bottom face. In some examples, each drawer further includes walls defining a drawer cavity. In some examples, each drawer includes right, left, and rear walls, but includes an open face, facilitating easy removal of elongate objects (e.g., markers or pens) stored within each drawer.

Each drawer includes at least one forward vertical projection or fin including a front-facing abutment surface, and at least one rear vertical projection or fin including a rear-facing abutment surface coupled to the top face of the drawer. The front-facing abutment surface and the rear-facing abutment surface are spaced apart from each other, such that the two abutment surfaces are disposed on opposite sides of a midline of the drawer, the midline being an imaginary line oriented orthogonal to a direction of travel of the drawer to divide the drawer into a front and a back section. In some examples, the front-facing abutment surface and the rear-facing abutment surface extend vertically from a first divider oriented along the direction of travel of the drawers (e.g., extending at least partially along a front-to-back length of the drawer). In some examples, each drawer further comprises a second divider including a second pair of vertical projections or fins comprising a second front-facing abutment surface and a second rear-facing abutment surface. The second divider may be oriented parallel to the first divider, and may be disposed on an opposite side of a centerline of the drawer from the first divider, the centerline being an imaginary line running in the direction of travel and dividing the drawer into left and right sections. Each drawer is divided into at least two compartments by the first divider. In some examples, each drawer is divided into at least three compartments by the first divider and the second divider.

The front-facing fin and rear-facing fin of each divider are configured to be received by a slot coupled to a bottom face of a vertically-adjacent drawer (e.g., the drawer immediately above). Accordingly, the drawers are interlocked by the paired slots and fins. Each slot includes a rear-facing bumper spaced apart from a front-facing bumper. In some examples, the rear-facing bumper comprises a forward end of the slot, and the front-facing bumper comprises a rear end of the same slot. In some examples, each rear-facing bumper may be disposed forward of the midline of the expanse, and each front-facing bumper may be disposed rearward of the midline.

The plurality of drawers are interlocked by the fins and slots, such that pulling on a bottommost drawer of the plurality of drawers is configured to automatically pull an adjacent upper one of the drawers partially open due to interaction between the front-facing abutment surface of the lower drawer and the rear-facing bumper of the upper drawer. Each drawer of the plurality of drawers is interlocked with vertically adjacent drawers, such that sustained pulling on the bottommost drawer causes all (or several) drawers of the plurality of drawers to extend at least partially from within the housing as a result of chained interactions between the drawers.

Each slot may be longer than a distance between the front-facing and rear-facing abutment surfaces by an offset length. Accordingly, the plurality of drawers may be staggered by the offset length when the drawers are in the deployed configuration, with lower drawers of the plurality of drawers extending farther out of the housing than higher drawers. In some examples, the bottommost drawer includes one or more pull tabs configured to facilitate manually transitioning the shelves between the stowed and deployed configurations.

In some examples, each drawer further includes a plurality of dividers (e.g., flanges or ridges) oriented along an axis of travel of the drawers, such that each drawer is configured to hold and organize a plurality of elongate objects (e.g., markers or pens). The drawers may be configured to hold a marker or pen in a substantially horizontal orientation, such that ink within the marker or pen is evenly distributed throughout the body of the pen.

EXAMPLES, COMPONENTS, AND ALTERNATIVES

The following sections describe selected aspects of illustrative desktop storage organizers as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Desktop Storage Organizer

As shown in FIGS. 1-23, this section describes an illustrative desktop organizer 100. Desktop organizer 100 is configured to provide accessible storage of elongate objects, such as writing implements and/or the like.

Organizer 100 includes an outer housing 102 (AKA a shell and/or a case) holding a plurality of slide-out storage drawers 104 (AKA shelves). The housing has a generally cuboidal shape, forming an enclosure on top, bottom, and on four sides. An open front face has a peripheral frame 106 defining an opening for interacting with the storage shelves and items stored thereon.

Figure 2:
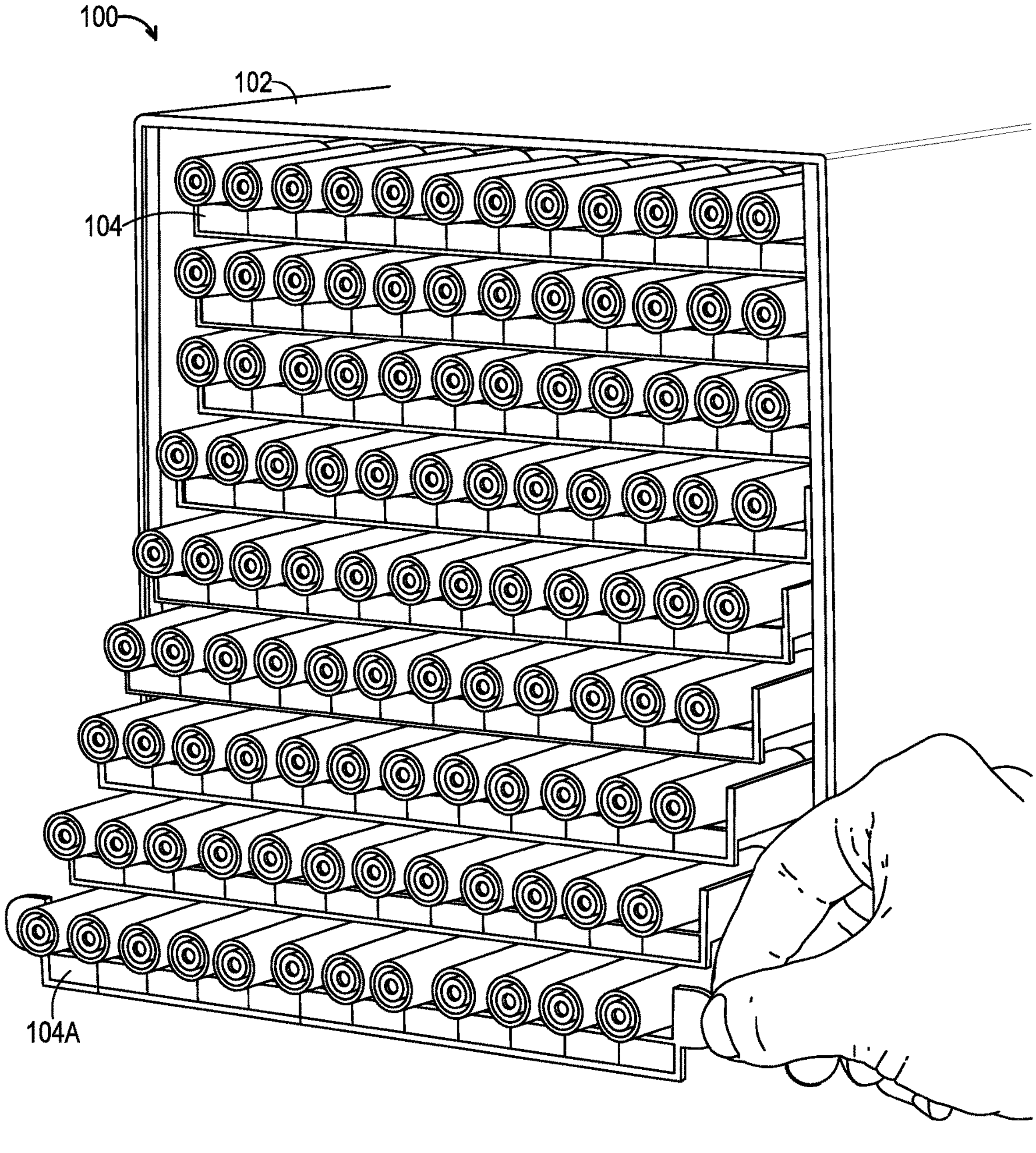
FIG. 2 is an isometric view of the illustrative desktop organizer of FIG. 1, depicted as being transitioned from a stowed configuration to a deployed configuration by a user.
Figure 3:
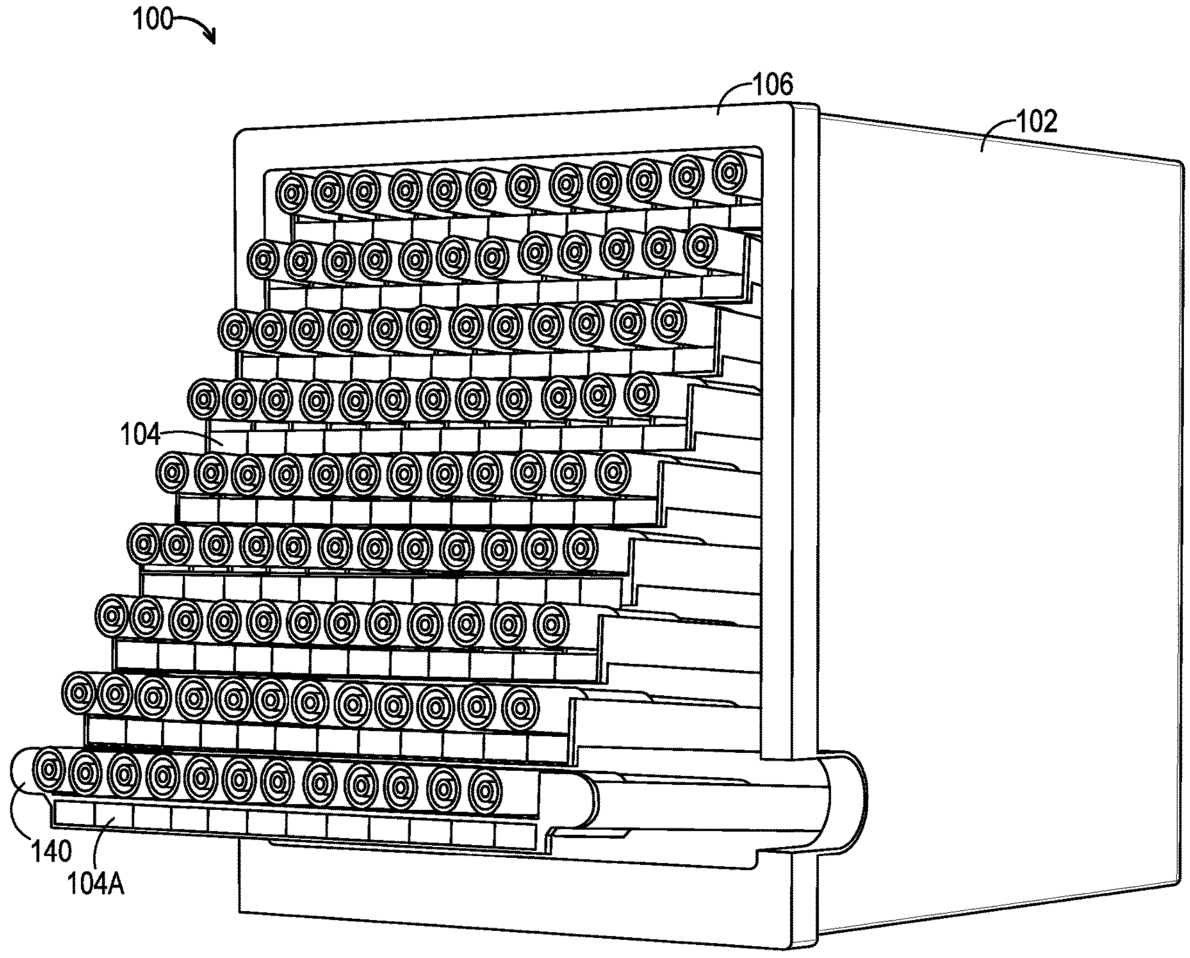
FIG. 3 is an isometric view of the illustrative desktop organizer of FIG. 1, depicted in a deployed configuration.
Figure 4:
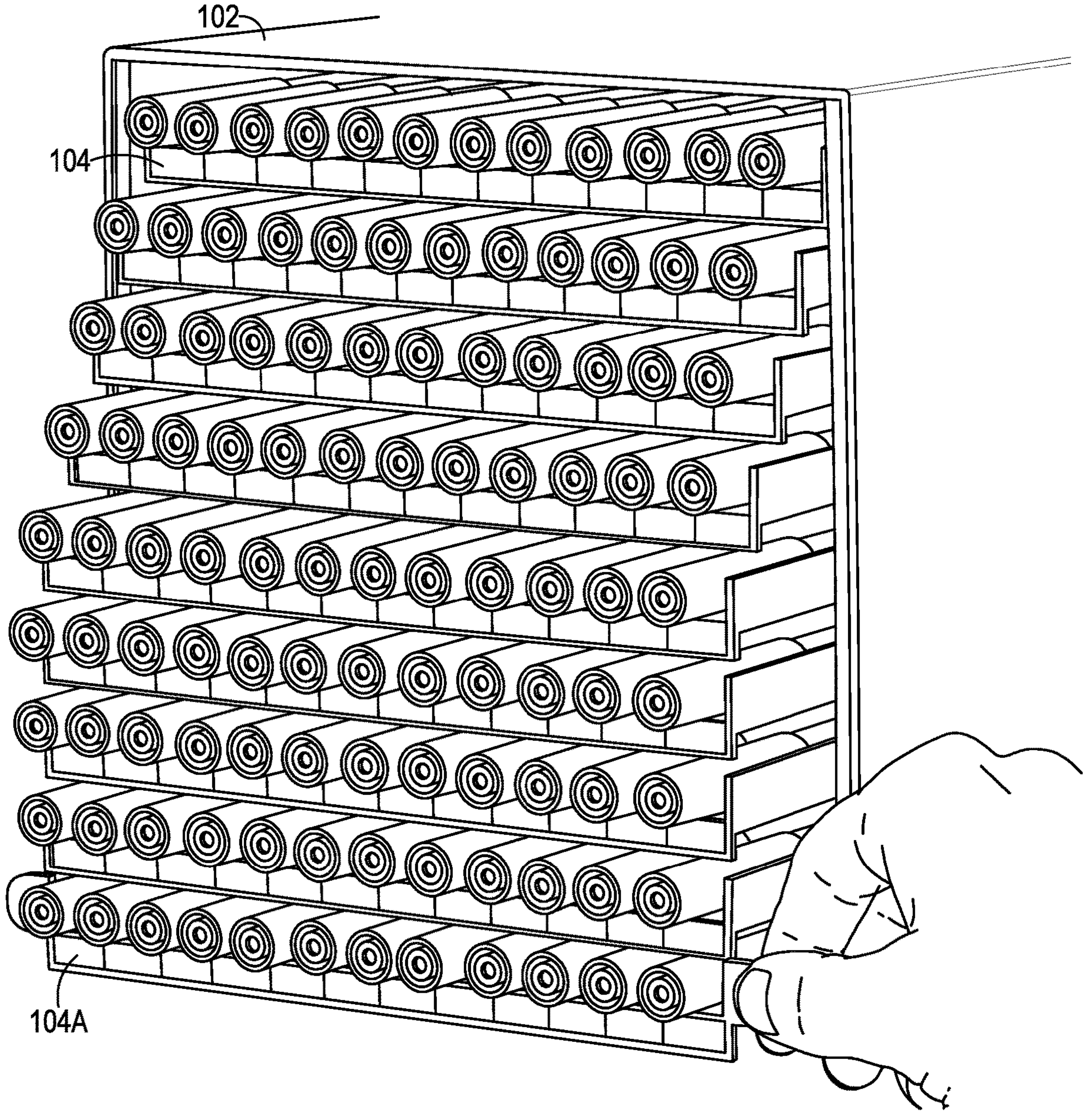
FIG. 4 is an isometric view of the illustrative desktop organizer of FIG. 1, depicted as being transitioned from a deployed configuration to a stowed configuration by a user.

Storage drawers 104 are interlocked such that a user may withdraw all drawers from within the housing by interacting with a bottommost drawer 104A. FIGS. 1-4 depict a user transitioning drawers 104 between a stowed configuration (see FIG. 1), and a deployed configuration (see FIG. 3). When drawers 104 are stowed, all drawers are contained by housing 102. When drawers 104 are deployed, some of the drawers extend at least partially from housing 102. As depicted in FIGS. 2 and 4, drawers 104 pass through intermediate configurations, wherein some of the drawers are withdrawn from the housing and others of the drawers are retained by the housing. As the drawers are withdrawn from the housing by a user interacting with the bottommost drawer, intermediate configurations include one or more lower drawers withdrawn from the housing and one or more upper drawers retained by the housing.

Figure 5:
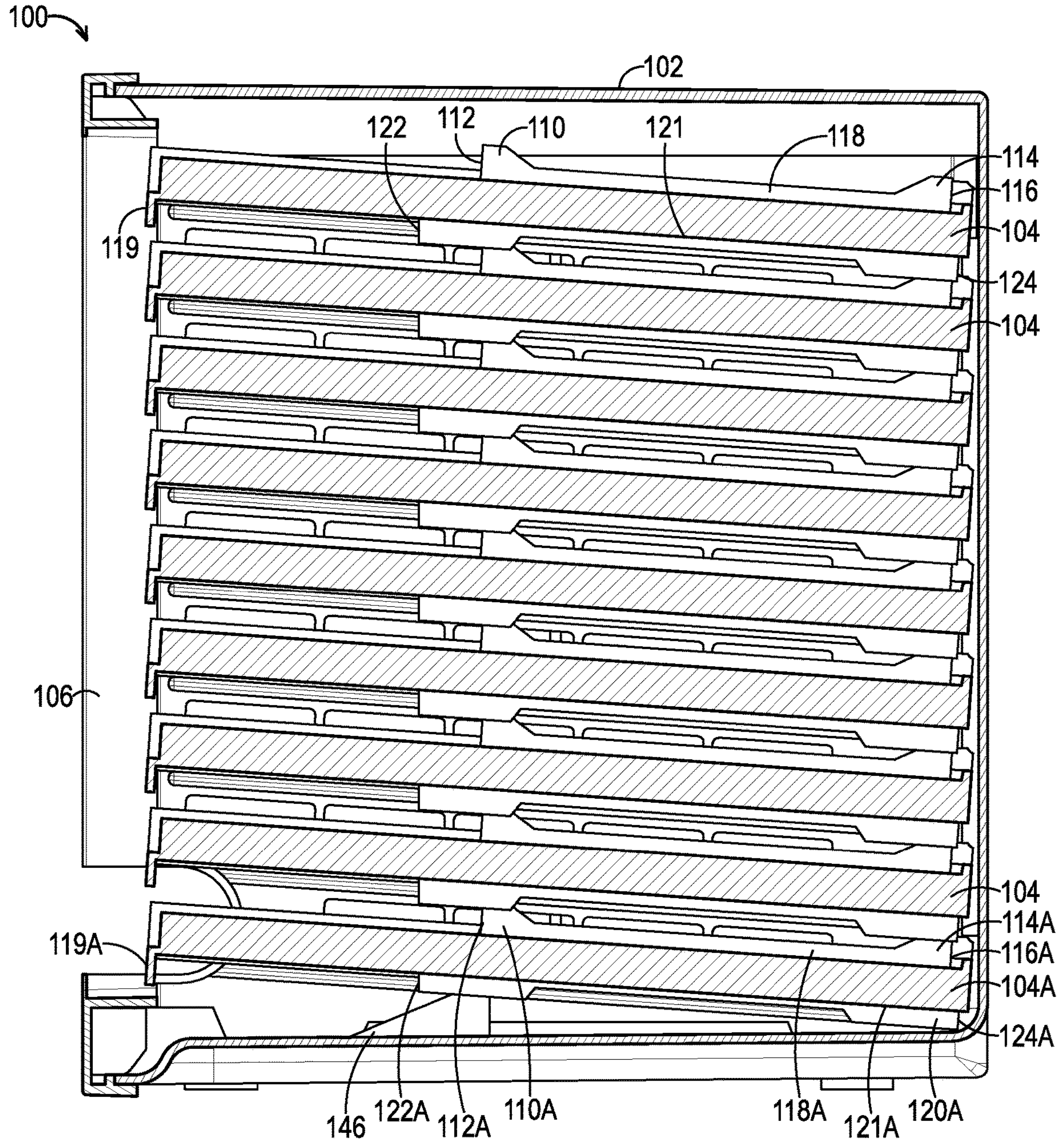
FIG. 5 is a sectional view of the illustrative desktop organizer of FIG. 1, depicted in a stowed configuration.

As depicted in FIG. 5, drawers 104 are interlocked by paired spaced-apart vertical projections (AKA fins) and slots. Each drawer includes a front-facing fin 110 and a rear-facing fin 114 extending vertically from a top surface 111 of the drawer. Each front-facing fin 110 includes a front-facing abutment surface 112 spaced apart from a rear-facing abutment surface 116 of rear-facing fin 114. In some examples, front-facing fin 110 and rear-facing fin 114 extend vertically from a divider 118 extending parallel to left and right edges of the drawer (e.g., along a direction of travel of the drawer). Divider 118 may partition the drawer into two compartments, each configured to retain one or more elongate objects such as writing utensils. Front-facing fin 110 and rear-facing fin 114 may have any suitable shape, such as triangular, trapezoidal, shark-fin shaped, square, rectangular, and/or the like. In some examples, divider 118 is substantially rectangular, and front-facing abutment surface 112 and rear-facing abutment surface 116 comprise front and rear edges of divider 118 (i.e., divider 118 does not include any fins or vertical protrusions).

Front-facing fin 110 and rear-facing fin 114 are received by a complementary slot 120 of a vertically adjacent drawer. Complementary slot 120 includes a rear-facing bumper 122 spaced apart from a front-facing bumper 124. The fins and slots are configured to cause the drawers to interact with each other and the housing, such that each drawer can be withdrawn or extended out of the housing simply by fully extending bottommost drawer 104A with respect to the housing. When drawers 104 are transitioned from the stowed configuration to the deployed configuration, front-facing abutment surfaces of each drawer contact rear-facing bumpers of an adjacent drawer, pulling the drawer along a direction of travel. Similarly, when drawers 104 are transitioned from the deployed configuration to the stowed configuration, rear-facing abutment surfaces of each drawer contact front-facing bumpers of an adjacent drawer, pulling the drawer along the direction of travel of the drawer. Accordingly, each drawer is pulled along by an adjacent drawer, regardless of whether the drawer is being stowed within the housing or removed from the housing. This configuration of interlocked drawers decreases a length of a force vector applied to each drawer while pulling or pushing on the drawers, reducing torque applied to the slots and fins.

Each slot 120 is longer than a distance between the front-facing and rear-facing abutment surfaces 112, 116 by an offset length 126. Accordingly, each drawer travels a distance equal to the offset length before contacting an adjacent drawer, resulting in the drawers being staggered or stepped by the offset length when in the deployed configuration. Accordingly, when the drawers are in the deployed configuration, bottommost drawer 104A is extended from the housing by a greater distance than a drawer disposed immediately above the bottommost drawer, and each subsequent drawer is slightly more extended than the one above it. As can be seen in FIG. 3, an uppermost drawer of the plurality of drawers is fully retained by the housing when the drawers are in the deployed configuration.

Figure 6:
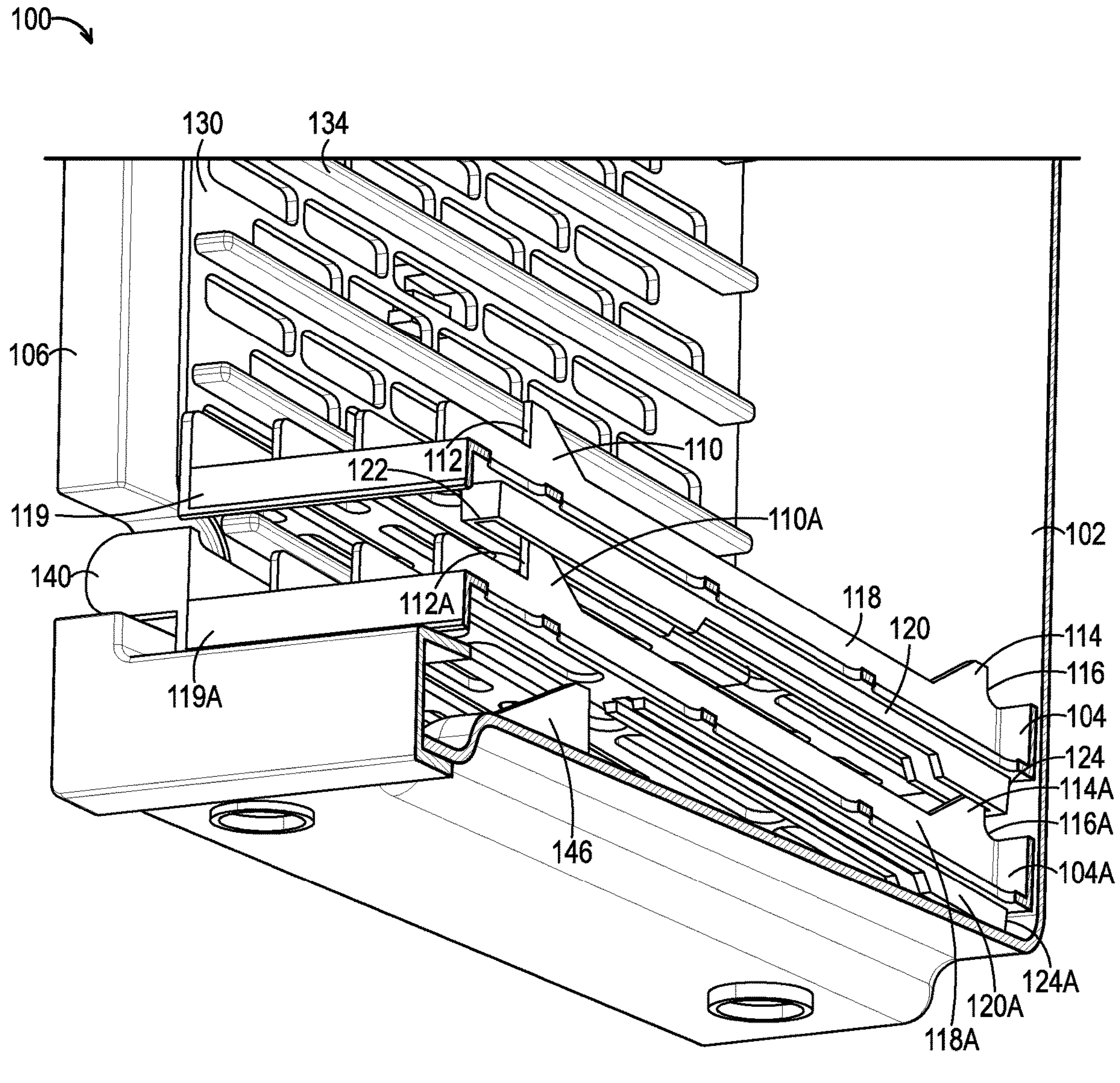
FIG. 6 is a partial isometric sectional view of an illustrative desktop organizer including only the bottommost two drawers of the organizer.
Figure 7:
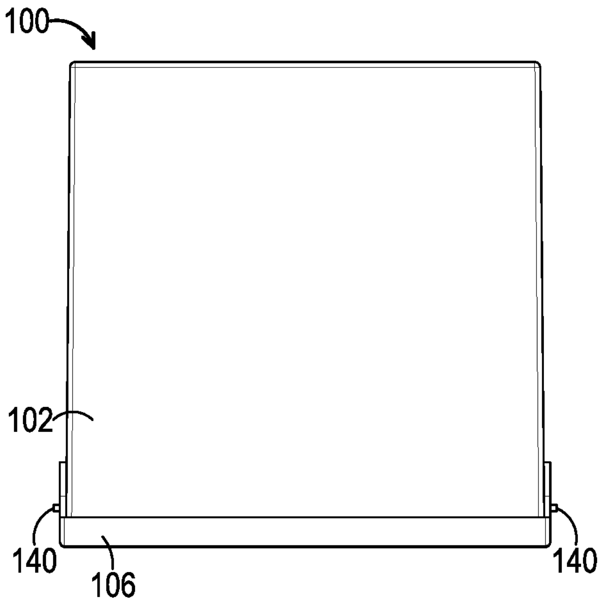
FIG. 7 is a top plan view of the illustrative desktop organizer of FIG. 1, depicted in a stowed configuration.
Figure 8:
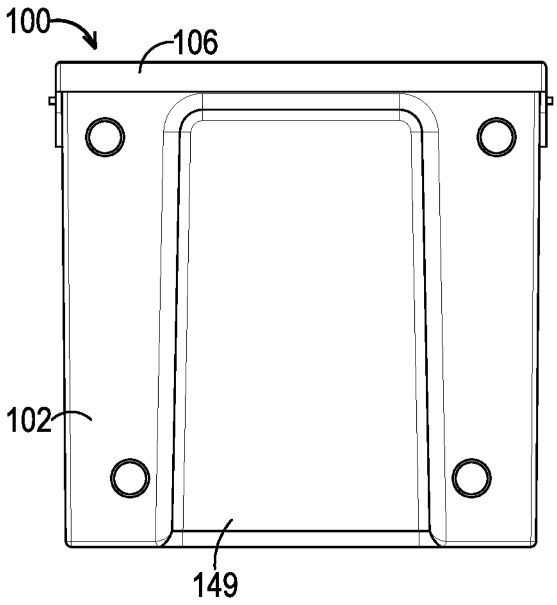
FIG. 8 is a bottom plan view of the illustrative desktop organizer of FIG. 1, depicted in a stowed configuration.
Figure 9:
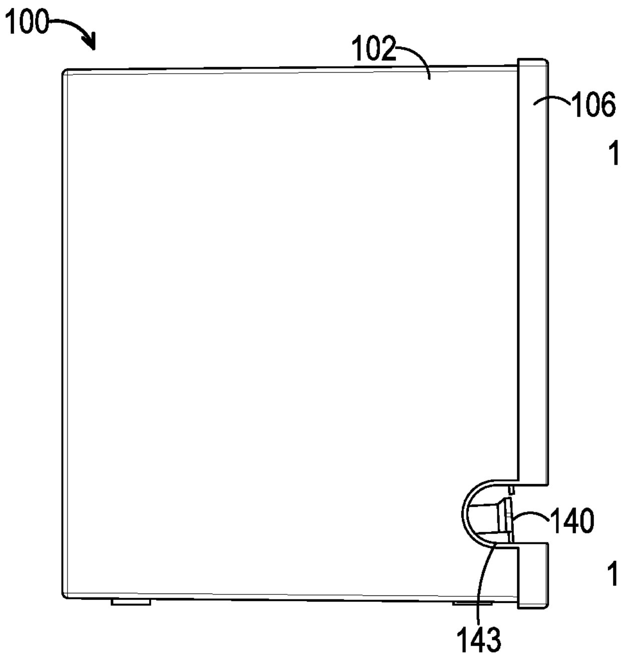
FIG. 9 is a left elevation view of the illustrative desktop organizer of FIG. 1, depicted in a stowed configuration.
Figure 10:
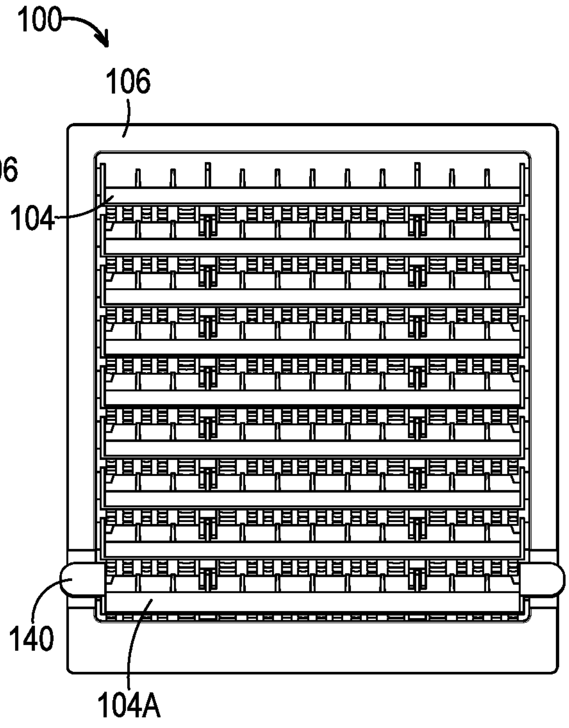
FIG. 10 is a front elevation view of the illustrative desktop organizer of FIG. 1, depicted in a stowed configuration.
Figure 11:
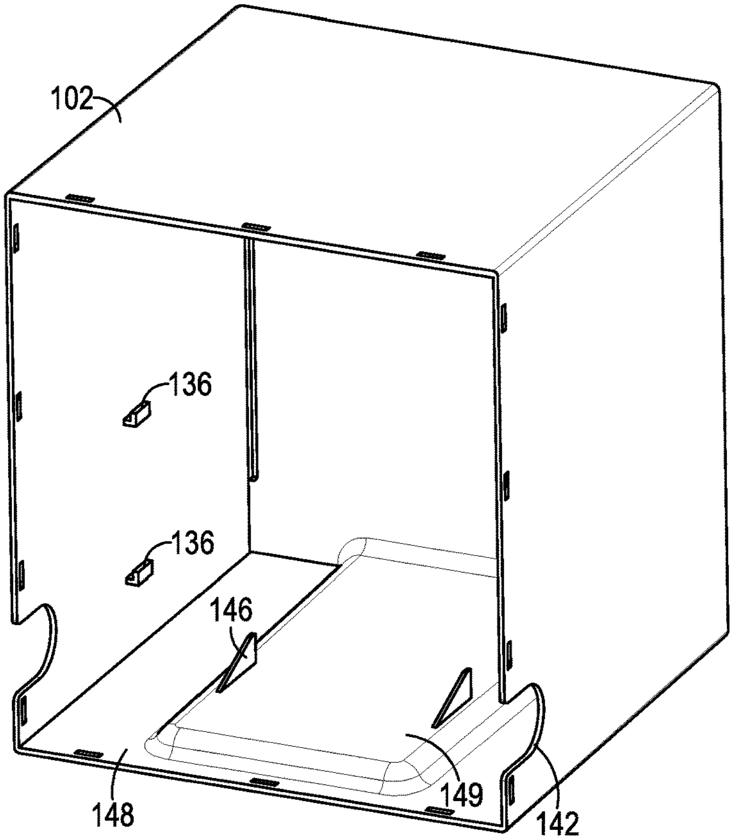
FIG. 11 is an isometric view of an illustrative housing suitable for inclusion in a desktop organizer in accordance with aspects of the present disclosure.
Figure 12:
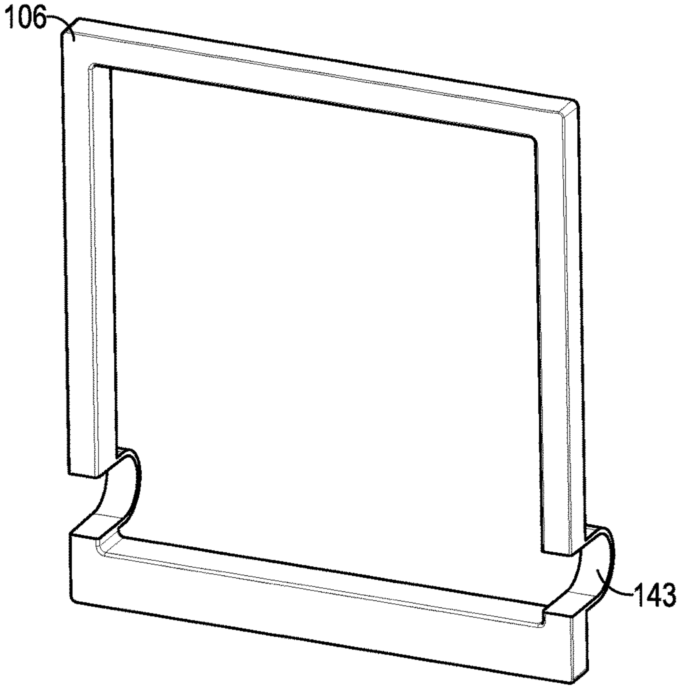
FIG. 12 is an isometric view of a peripheral frame configured to be coupled to the housing of FIG. 11.

FIG. 6 depicts a partial sectional view of desktop organizer 100, including bottommost drawer 104A and an additional drawer 104 of the plurality of drawers received by housing 102. Housing 102 includes side panels 130, 132 coupled to walls of housing 102. Side panels 130, 132 include angled rails 134 configured to slidably support left and right edges of drawer 104, 104A. Rails 134 are angled such that a front end of rails 134 is higher than a back end of rails 134, supporting drawers 104, 104A in a slanted orientation configured to retain drawers 104, 104A within the housing and to retain elongate objects (e.g., writing utensils, etc.) within the drawers.

Bottommost drawer 104A of drawers 104 has various additional or alternative features configured to facilitate operation of the desktop organizer. First, bottommost drawer 104A has a pair of pull tabs 140 configured to act as a graspable manual interface for urging the drawers out of or into the housing (AKA manually deploying the plurality of drawers). One pull tab 140 extends laterally from each front corner of the drawer. Pull tabs 140 may have any suitable shape or size. In this example, pull tabs 140 are flat and generally coplanar with a front face of the housing, and outer ends of the pull tabs have a rounded profile when viewed from the front. Pull tabs 140 extend beyond the outer limits of the housing, and are received in a corresponding cutout 142, 143 on each side of housing 102 and peripheral frame 106. In some examples, bottommost drawer 104A includes a single pull tab 140 extending laterally from a single side of the front corner of the drawer.

Second, bottommost drawer 104A may have slots 120A on an underside of the drawer that differ from slots 120 of drawers 104. In some examples, slots 120A are open-ended on their front ends. As each of slots 120A interacts with only a single fin 146 rather than a pair of fins 110, 114, a first end of the slot may be redundant. Furthermore, slots 120A of bottommost drawer 104A are configured to interface with fins 146 extending upward from a bottom face 148 of the housing, instead of with fins of an adjacent drawer. However, in some examples, bottommost drawer 104A may have slots which are substantially identical to slots 120, and may include slots having closed front ends. In some examples, housing 102 may include paired fins 146 extending from bottom face 148, which may be configured to contact both a front end and a back end of slots 120A.

As bottommost drawer 104A (e.g., the first drawer) interacts with housing 102, it interacts with adjacent drawer 104. Outward motion of bottommost drawer 104A is configured to be arrested when rear ends of slots 120A abut fins 146, which are disposed at a fixed location with respect to housing 102. As bottommost drawer 104A travels outward, e.g., as a result of someone pulling on pull tab(s) 140, front-facing abutment surfaces 112 of the bottommost drawer will travel a selected distance before abutting the rear-facing bumpers 122 of slots 120 of the drawer immediately above (e.g., the second drawer). This urges the second drawer outward as well. Front-facing abutment surfaces 112 of the second drawer will travel a selected distance, then abut the rear-facing bumpers 122 of slots 120 of a third drawer, causing that drawer to move outward, and so on up the plurality of drawers. As described above, the offset length (e.g., the distance a drawer may travel before the front-facing abutment surfaces strike the rear-facing bumpers) of each drawer is substantially the same. This results in the staggered withdrawal of the drawers, and is configured such that the top shelf does not move outward much, if at all. When all of the shelves are so extended, the organizer is in the deployed configuration. Items stored on the shelves can then be more easily viewed, accessed, stored, and/or replaced.

Conversely, urging bottommost drawer 104A back into housing 102 will slide the drawer along its rails. When rear-facing abutment surfaces 116 of the bottommost drawer abut the front-facing bumpers 124 of slots 120 of the second drawer, the second shelf will also be urged inward. Rear-facing abutment surfaces 116 of the second drawer eventually strike the front-facing bumpers of slots of the third drawer, and so on up the plurality of drawers, until all shelves are completely re-stowed. This is the stowed configuration of the organizer.

FIGS. 7-12 depict housing 102 and peripheral frame 106. As described above, housing 102 and peripheral frame 106 each include a pair of cutouts 142, 143 configured to receive pull tabs 140 of the bottommost drawer. Housing 102 includes a pair of fins 146 extending upward from a bottommost face of the housing. Fins 146 are configured to arrest outward motion of bottommost drawer 104A. In some examples, housing 102 may include a platform 149 configured to support fins 146, bringing fins 146 in contact with a bottom face 121 of bottommost drawer 104A. In some examples, platform 149 may be slanted and configured to support a bottom face Housing 102 may include tabs 136 extending from left and right sides of the housing configured to support side panels 130, 132. In some examples, tabs 136 may comprise hooked protrusions configured to receive complementary hooks 138 of side panels 130, 132. Housing 102 and peripheral frame 106 may comprise any suitable rigid materials, such as plastic, glass, wood, metal, and/or the like.

Figure 13:
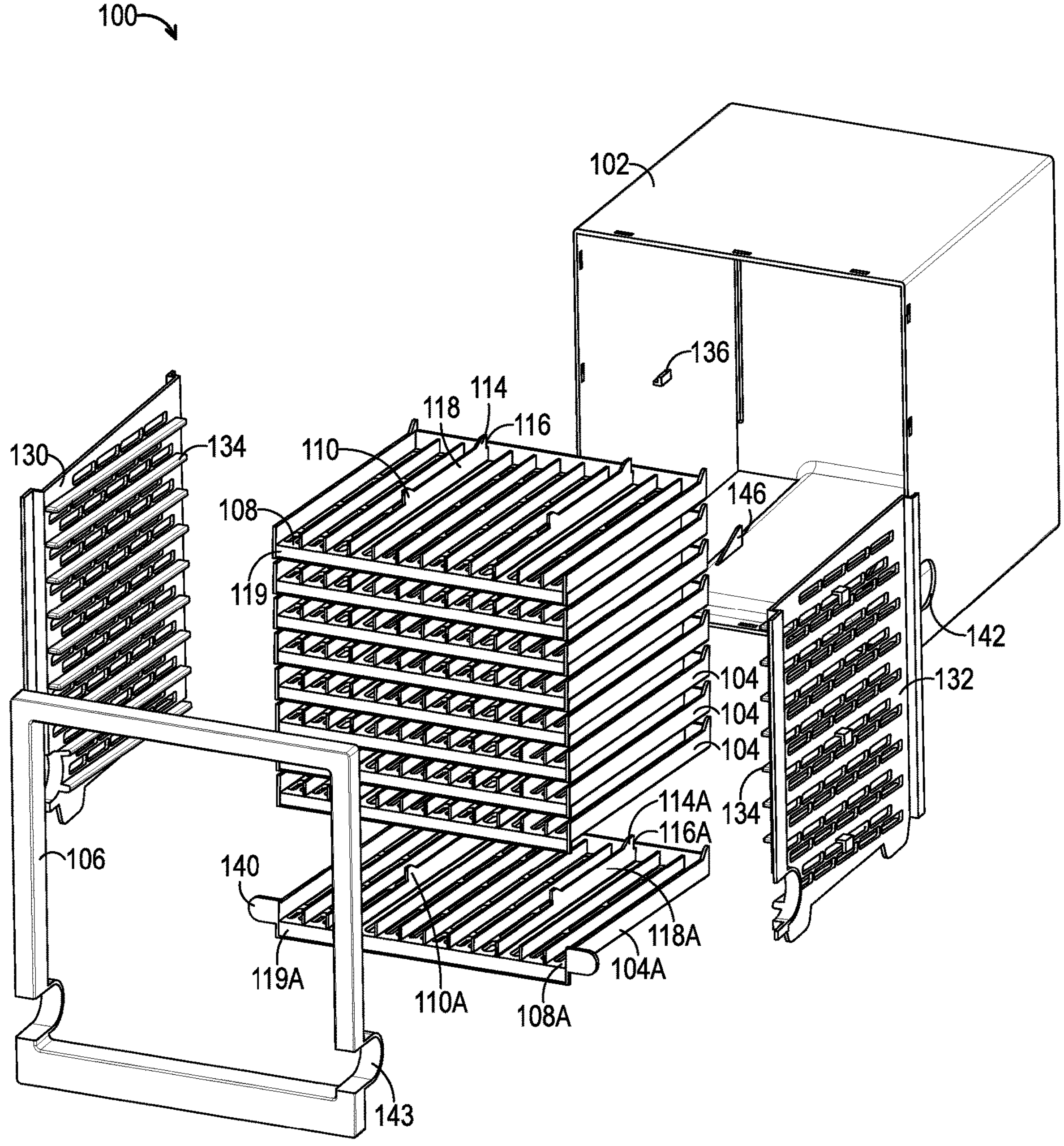
FIG. 13 is an exploded view of the illustrative desktop organizer of FIG. 1.
Figure 14:
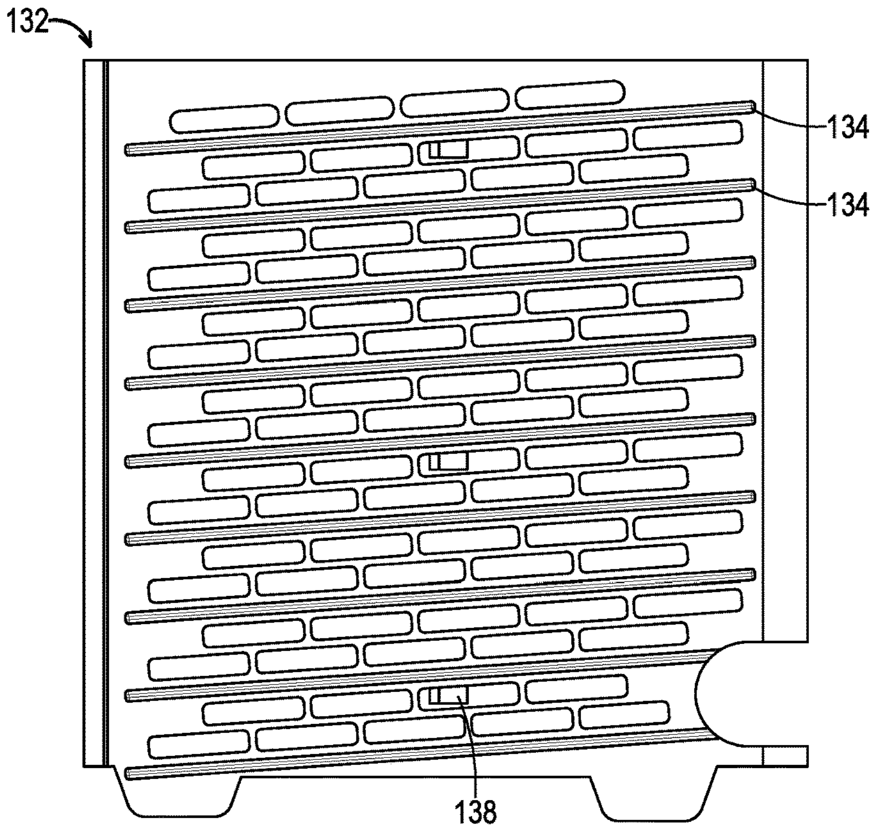
FIG. 14 is a left elevation view of an illustrative side panel suitable for inclusion in a desktop organizer in accordance with aspects of the present disclosure.
Figure 15:
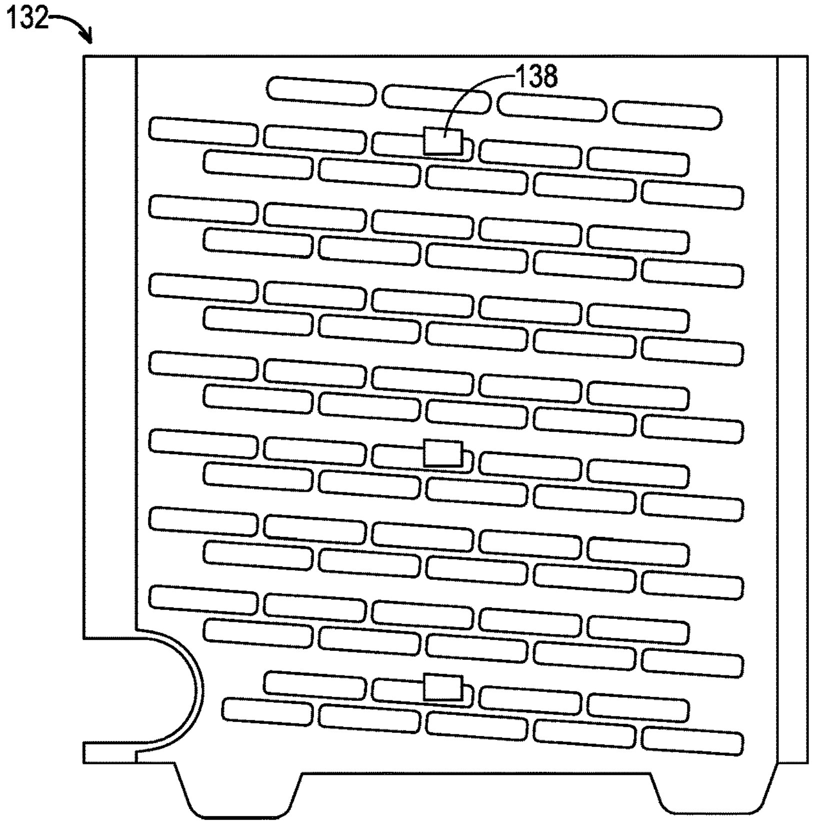
FIG. 15 is a right elevation view of the illustrative side panel of FIG. 14.
Figure 16:
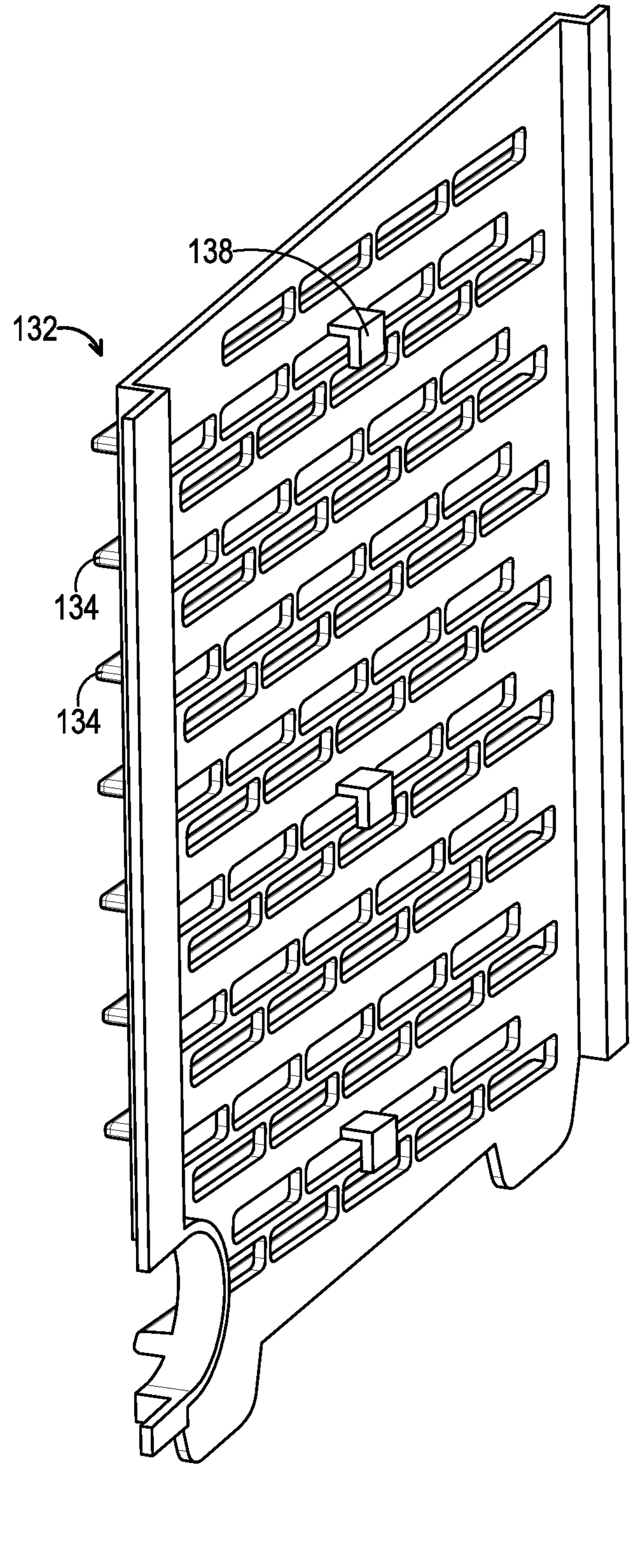
FIG. 16 is an isometric view of the illustrative side panel of FIG. 14.
Figure 17:
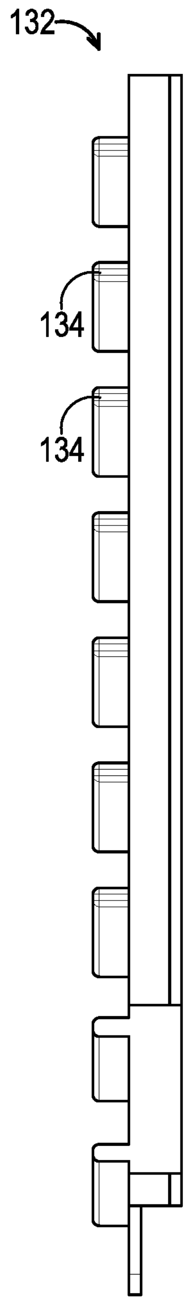
FIG. 17 is a front elevation view of the illustrative side panel of FIG. 14.

FIG. 13 depicts an exploded view of desktop organizer 100. Desktop organizer 100 includes left and right side panels 130, 132, which are configured to be coupled to left and right walls of housing 102. Side panels 130, 132 include rails 134 configured to slidably support a plurality of drawers 104, 104A in a slightly angled orientation. Each drawer of the plurality of drawers is supported by a pair of rails along which the drawer may slide out of or into housing 102.

FIG. 14-17 depict right side panel 132 of desktop organizer 100, which is coupled to a right wall of housing 102. Right side panel 132 includes a plurality of rails (AKA sliders) 134 in the form of ramped, linear protrusions on which drawers 104 can sit and slide. Rails 134 are oriented such that the rear end of each slider is lower than the front end. This facilitates retention of items on a corresponding drawer, and prevents unintentional outward movement of the drawer. In this example, side panels 130 and 132 are separate structures configured to clip onto inner surfaces of the housing walls. In this example, side panels 130 and 132 each include a plurality (in this case, three) of hooks 138 configured to interface with tabs 136 of housing 102. In some examples, side panels 130, 132 may be configured to attach to housing 102 using any suitable fasteners, such as snaps, buttons, hook-and-loop fasteners, peg-and-hole fasteners, adhesive tape, and/or the like. In some examples, panels 130, 132 are unitary with the housing, e.g., formed as a single piece. Panels 130, 132 may comprise any suitable rigid materials, such as plastic, glass, wood, metal, and/or the like.

Figure 18:
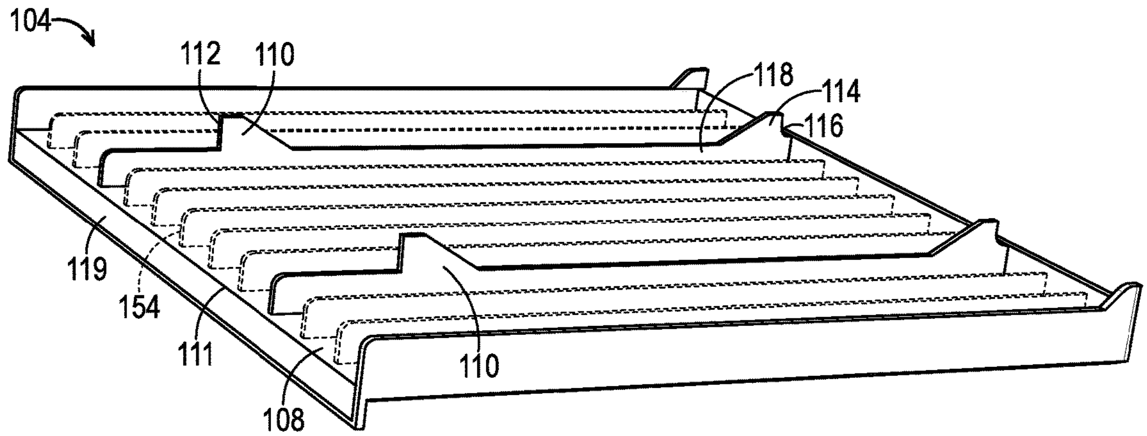
FIG. 18 is a first isometric view of an illustrative drawer suitable for inclusion in a desktop organizer in accordance with aspects of the present disclosure.
Figure 19:
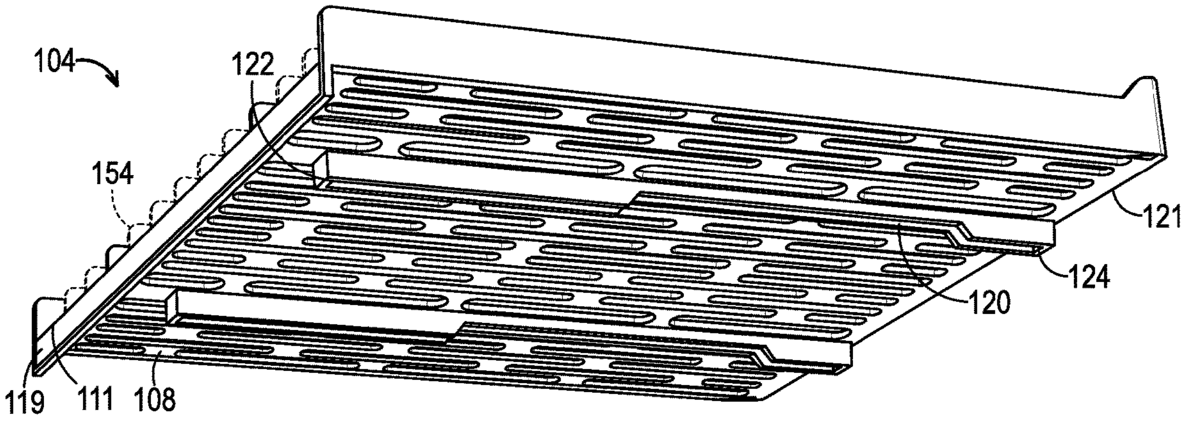
FIG. 19 is a second isometric view of the illustrative drawer of FIG. 18.
Figure 20:
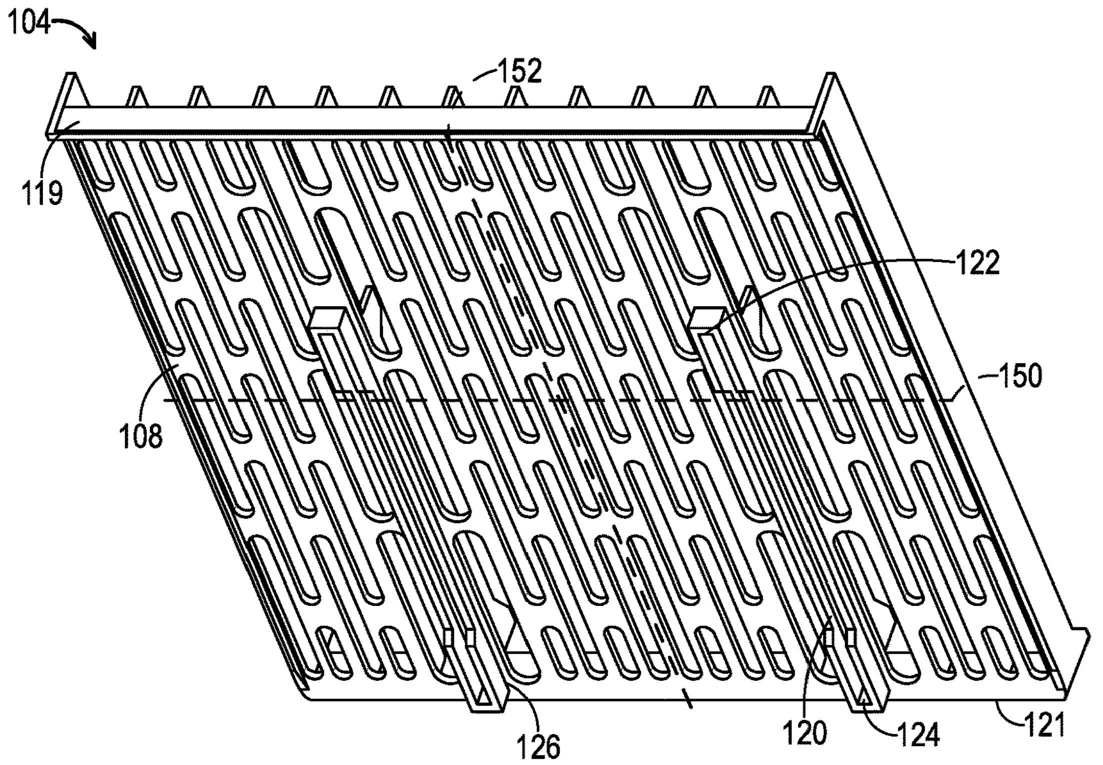
FIG. 20 is a first bottom isometric view of the illustrative drawer of FIG. 18.
Figure 21:
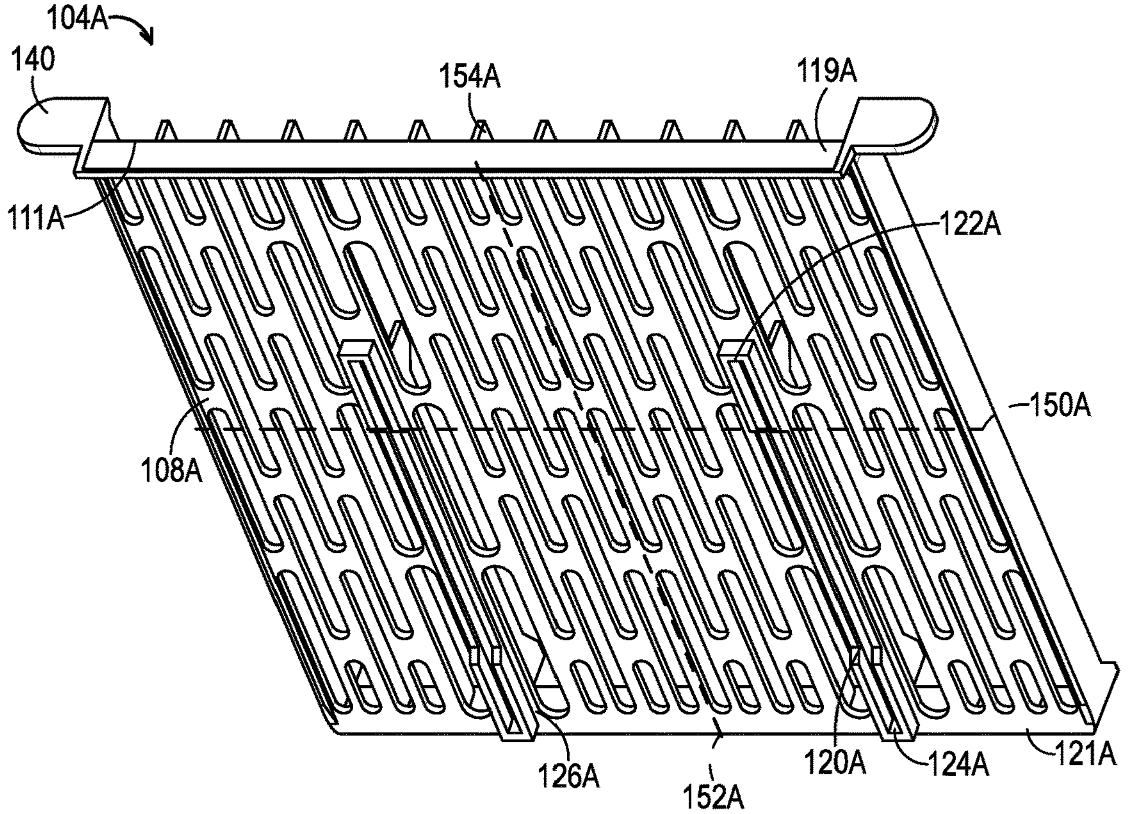
FIG. 21 is a second bottom isometric view of the illustrative drawer of FIG. 18.
Figure 22:
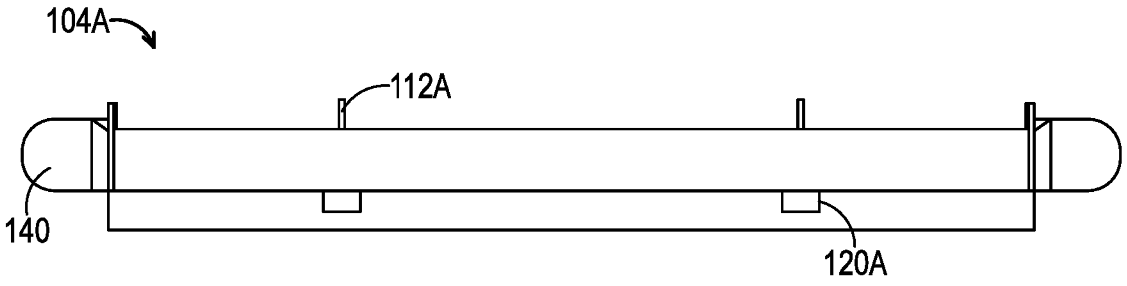
FIG. 22 is a front elevation view of the illustrative drawer of FIG. 18.
Figure 23:
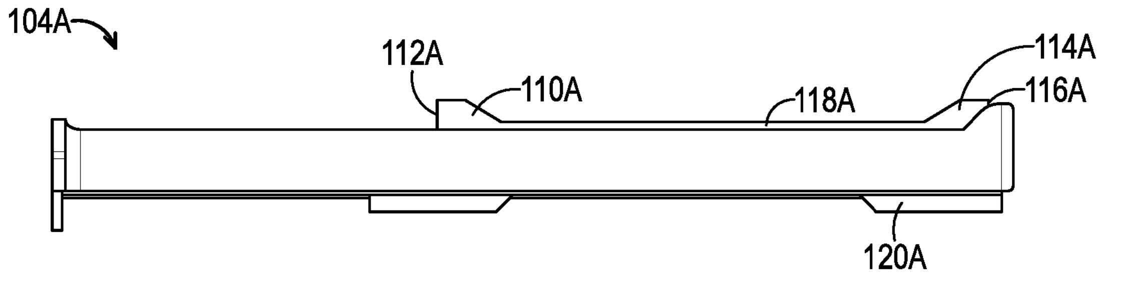
FIG. 23 is a right elevation view of the illustrative drawer of FIG. 18.

As depicted in FIG. 18-23, each one of drawers 104, 104A comprises a generally rectangular expanse 108, 108A including spaced-apart fins (AKA vertical protrusions) 110, 110A, 114, 114A extending upward from a top face 111, 111A of the expanse. FIGS. 18-20 depict a drawer 104 suitable for use as an upper drawer of the plurality of drawers. FIGS. 21-23 depict a drawer 104A suitable for use as a bottommost drawer of the plurality of drawers. In some examples, a pair of fins comprising one front-facing fin 110, 110A and one rear-facing fin 114, 114A may extend from a same vertical divider 118, 118A extending along a length of the expanse, oriented front to back (e.g., along a direction of travel of the drawers). Each drawer may include lateral edges configured to sit atop a pair of rails 134. Each drawer 104, 104A is thus configured to slide into and out of the housing as desired, and elongate items (e.g., pens) can be stored between adjacent dividers. In some examples, each drawer may have an open front face, such that elongate items may be easily removed from the drawer. A facade or lip 119, 119A hangs down from a front edge of each drawer 104, 104A. Labels or other indicia may be applied to or included on facade 119, 119A.

Fins 110, 110A, 114, 114A may be spaced apart both with respect to a midline 150, 150A and a centerline 152, 152A of the drawer. Front-facing fins 110, 110A and rear-facing fins 114, 114A may be disposed on opposing sides of a midline 150, 150A extending from left to right across the expanse of the drawer. Pairs of front-facing and rear-facing fins may be spaced apart from each other, such that a first pair of fins is disposed on a first side of a centerline 152, 152A extending from front to back across the expanse of the drawer and a second pair of fins is disposed on a second side of the centerline. In examples wherein each pair of front-facing fins 110, 110A and rear-facing fins 114, 114A extends vertically from a divider 118, 118A, the dividers may be spaced apart from each other, such that a first divider is disposed on a first side of the centerline and a second divider is disposed on a second side of the centerline. The dividers may be configured to separate the drawer into storage areas or storage compartments. In some examples, the first divider and the second divider separate the first drawer into at least a first storage area, a second storage area, and a third storage area. In some examples, drawer 104, 104A further comprises supplemental partitions 154, 154A which extend from front to back across the expanse of the drawer, but which do not include fins. The supplemental partitions may be configured to further partition the drawer into compartments suitable for the storage of elongate objects, such as markers, pens, and/or the like.

Each front-facing fin 110, 110A includes a front-facing abutment surface 112, 112A which is configured to contact a corresponding rear-facing bumper 122 of a slot 120 disposed on a bottom surface of a vertically-adjacent drawer. Similarly, each rear-facing fin 114, 114A includes a rear-facing abutment surface 116, 116A which is configured to contact a corresponding front-facing bumper 124 of a slot 120 disposed on a bottom face 121 of a vertically-adjacent drawer. Fins 110, 110A, 114, 114A may have any suitable shape and size configured to provide an abutment surface as described above. In this example, fins 110, 110A, 114, 114A have a generally triangular shape, with a vertical edge facing forward (i.e., to provide a front-facing abutment surface) or rearward (i.e., to provide a rear-facing abutment surface). In some examples, front-facing fin 110, 110A may have any suitable shape providing a forward-facing vertical edge, such as triangular, trapezoidal, rectangular, shark-fin shaped, and/or the like. In some examples, rear-facing fin 114, 114A may comprise a curved vertical edge configured to accommodate a slope of the drawer, and may have any suitable shape such as triangular, trapezoidal, shark-fin shaped, wave-shaped, rectangular, and/or the like.

One or more (in this case two) slots 120, 120A are formed on a bottom face 121, 121A of the drawer, each having a long axis oriented front to back, such that each slot extends at least partially along a front-to-back length of the drawer. Each slot 120, 120A is configured to receive at least one fin protruding upward from a shelf immediately below. In some examples, each slot 120, 120A is configured to receive a single fin, and the drawer includes two pairs of colinear slots 120, 120A. In some examples, each slot 120, 120A is configured to receive a front-facing fin 110, 110A and a rear-facing fin 114, 114A. In these examples, each slot 120, 120A includes a rear-facing bumper 122, 122A configured to abut a front-facing abutment surface 112, 112A and a front-facing bumper 124, 124A configured to abut a rear-facing abutment surface 114, 114A. Rear-facing bumper 112, 112A and front-facing bumper 124, 124A may be defined by respective ends of the slot. The rear-facing bumper and the front-facing bumper may be disposed on opposing sides of a midline 150, 150A extending from left to right across the expanse of the drawer. This configuration may distribute a pulling force applied to the drawer across the expanse of the drawer, minimizing torque applied to the slots and fins. In some examples, a first slot 120, 120A is disposed on a first side of a centerline 152, 152A extending front to back across the expanse of the drawer, and a second slot 120, 120A is disposed on a second side of the centerline.

As described above, each slot 120, 120A is longer than a distance between the front-facing and rear-facing abutment surfaces 112, 112A, 116, 116A by an offset length 126, 126A. Accordingly, the slot and the fins are movable with respect to each other in a front-to-back direction. To facilitate this motion, a lateral width of the slot may be greater than a lateral thickness of the fins, such that the fins do not necessarily touch the lateral walls of the slot.

B. Illustrative Method

Figure 24:
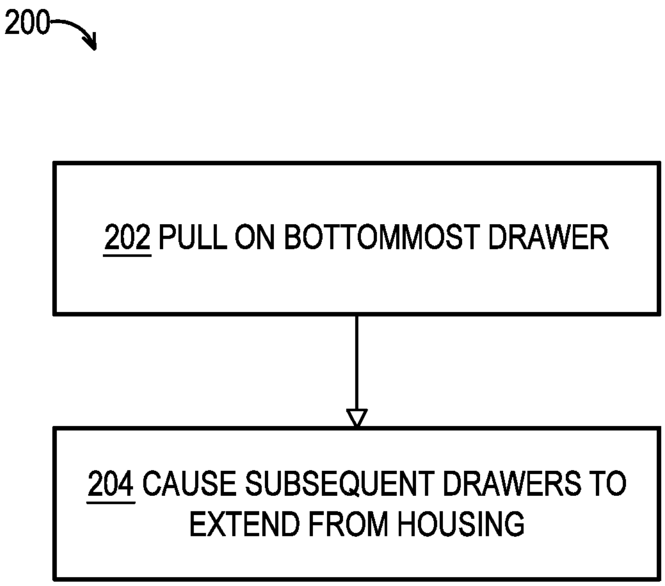
FIG. 24 is a flow chart depicting steps of an illustrative method of using a desktop organizer.

This section describes steps of an illustrative method 200 for withdrawing drawers from a housing; see FIG. 24. Aspects of illustrative desktop storage organizer 100 may be utilized in the method steps described below. Where appropriate, reference may be made to components and systems that may be used in carrying out each step. These references are for illustration, and are not intended to limit the possible ways of carrying out any particular step of the method.

FIG. 24 is a flowchart illustrating steps performed in an illustrative method, and may not recite the complete process or all steps of the method. Although various steps of method 200 are described below and depicted in FIG. 24, the steps need not necessarily all be performed, and in some cases may be performed simultaneously or in a different order than the order shown.

Step 202 of method 200 includes pulling on a bottommost (AKA first) drawer of a plurality of drawers included in a desktop storage organizer. In some examples, pulling on a bottommost drawer includes pulling on pull tabs extending from the bottommost drawer. Pulling on the bottommost drawer causes the bottommost drawer to withdraw from a housing containing the plurality of drawers. As the bottommost drawer withdraws from the housing, vertical fins extending from a top surface of the bottommost drawer contact rear-facing edges of corresponding slots extending from bottom surfaces of an adjacent (AKA second) drawer.

Step 204 of method 200 includes causing subsequent drawers to extend from a housing containing the plurality of drawers. Continuing to pull on the bottommost drawer causes the vertical fins of the bottommost drawer to pull on the rear-facing edges of the corresponding slots of the second drawer, withdrawing the second drawer from within the housing. As the second drawer is withdrawn from the housing, vertical fins extending from the second drawer contact rear-facing edges of corresponding slots extending from bottom surfaces of a third drawer. Continuing to pull on the bottommost drawer causes subsequent drawers to withdraw from the housing, resulting in a staggered deployed configuration of drawers.

C. Illustrative Combinations and Additional Examples

This section describes additional aspects and features of divided desktop organizers, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A desktop storage organizer comprising:

a housing having an open face; and a plurality of drawers disposed within the housing, each drawer comprising an expanse having a top face and an opposing bottom face;

wherein, for each of the drawers, the top face includes a front-facing abutment surface spaced from a rear-facing abutment surface and the bottom face includes a rear-facing bumper spaced from a front-facing bumper, such that the rear-facing bumper is disposed forward of a midline of the expanse and the front-facing bumper is disposed rearward of the midline;

wherein the plurality of drawers are interlocked by the bumpers and abutment surfaces, such that transitioning a lower one of the drawers from a stowed position to a deployed position is configured to automatically pull an adjacent upper one of the drawers partially open due to interaction between the front-facing abutment surface of the lower drawer and the rear-facing bumper of the upper drawer.

A1. The desktop storage organizer of paragraph A0, wherein the front-facing abutment surface and the rear-facing abutment surface of each drawer extend vertically from a first divider, wherein the first divider extends at least partially along a front-to-back length of the drawer.

A2. The desktop storage organizer of paragraph A0 or A1, wherein the rear-facing bumper and the front-facing bumper of each drawer are defined by respective ends of a slot extending at least partially along a front-to-back length of the drawer.

A3. The desktop storage organizer of any of paragraphs A0 through A2, wherein the rear-facing bumper of each drawer comprises an end of a first slot, and wherein the front-facing bumper of each drawer comprises an end of a second slot.

A4. The desktop storage organizer of paragraph A3, wherein the first slot and the second slot are colinear.

A5. The desktop storage organizer of any of paragraphs A0 through A4, wherein the lower one of the drawers further comprises one or more pull tabs configured to facilitate manually deploying the plurality of drawers.

A6. The desktop storage organizer of any of paragraphs A0 through A5, wherein the plurality of drawers are configured such that transitioning a lower one of the drawers from the stowed position to the deployed configuration causes the front-facing abutment surface of the lower one of the drawers to contact the rear-facing bumper of an upper one of the drawers, such that the lower one of the drawers pulls the upper one of the drawers at least partially out of the housing.

A7. The desktop storage organizer of any of paragraphs A0 through A6, wherein each rear-facing bumper is spaced apart from a corresponding front-facing abutment surface by an offset distance when the plurality of drawers are stowed, such that the drawers are staggered by the offset distance when the drawers are deployed from within the housing.

A8. The desktop storage organizer of any of paragraphs A0 through A7, wherein the top face further includes a second front-facing abutment surface spaced from a second rear-facing abutment surface.

A9. The desktop storage organizer of paragraph A8, wherein the second front-facing abutment surface and the second rear-facing abutment surface are disposed on an opposite side of a centerline of the expanse from the front-facing abutment surface and the rear-facing abutment surface.

A10. The desktop storage organizer of any of paragraphs A0 through A9, wherein the bottom face further includes a second rear-facing bumper spaced apart from a second forward-facing bumper, such that the second rear-facing bumper is disposed forward of the midline of the expanse and the second front-facing bumper is disposed rearward of the midline.

A11. The desktop storage organizer of any of paragraphs A0 through A10, wherein the housing comprises a plurality of rails configured to support respective left and right edges of each drawer of the plurality of drawers.

A12. The desktop storage organizer of paragraph A11, wherein the plurality of rails are sloped such that a front edge of each rail is higher than a rear edge of each rail, such that the drawers are biased toward remaining in the housing.

A13. The desktop storage organizer of any of paragraphs A0 through A12, wherein the housing comprises a pair of rear-facing fins configured to contact the front-facing bumper of a bottommost drawer of the plurality of drawers, such that the bottommost drawer is retained at least partially by the housing.

B0. A desktop storage organizer comprising:

a plurality of drawers disposed in a housing;

a first drawer of the plurality of drawers comprising a first divider oriented along a direction of travel of the drawer, the first divider having a front-facing abutment surface spaced apart from a rear-facing abutment surface, each of the abutment surfaces extending upward from the first divider; and a second drawer of the plurality of drawers comprising a first slot oriented along the direction of travel and configured to receive the abutment surfaces of the first divider, the first slot defining a rear-facing bumper spaced apart from a front-facing bumper, wherein the rear-facing bumper is disposed forward of a midline of the second drawer and the front-facing bumper is disposed rearward of the midline of the second drawer;

wherein the first drawer and the second drawer are interlocked by the first divider and the first slot, such that transitioning the first drawer between a stowed and a deployed configuration along the direction of travel causes the second drawer to transition between a stowed and a deployed configuration; and wherein the rear-facing bumper is spaced from the front-facing abutment surface by an offset distance when the first drawer is stowed, such that the drawers are staggered by the offset distance when the first drawer is deployed.

B1. The desktop storage organizer of paragraph B0, wherein the plurality of drawers are configured such that transitioning the first drawer between the stowed configuration and the deployed configuration causes the front-facing abutment surface to contact the rear-facing bumper of the first slot, such that the first drawer pulls the second drawer along the direction of travel.

B2. The desktop storage organizer of paragraph B0 or B1, wherein the first drawer is disposed beneath the second drawer, such that the first drawer extends beyond the second drawer by the offset distance when in the deployed configuration.

B3. The desktop storage organizer of any of paragraphs B0 through B2, wherein the first drawer further comprises a second divider oriented parallel to the first divider, and wherein the second divider further comprises a second front-facing abutment surface spaced apart from a second rear-facing abutment surface, each of the abutment surfaces extending upward from the second divider.

B4. The desktop storage organizer of paragraph B3, wherein the second drawer further comprises a second slot oriented parallel to the first slot and configured to receive the abutment surfaces of the second divider, the second slot having a second rear-facing bumper spaced apart from a second front-facing bumper.

B5. The desktop storage organizer of paragraph B3, wherein the first divider and the second divider separate the first drawer into at least a first storage area, a second storage area, and a third storage area.

B6. The desktop storage organizer of paragraph B3, wherein the first divider and the second divider are disposed on opposite sides of a centerline of the first drawer.

B7. The desktop storage organizer of any of paragraphs B0 through B6, wherein the housing comprises a plurality of rails configured to support respective left and right edges of the first and second drawers.

B8. The desktop storage organizer of any of paragraphs B0 through B7, wherein the front-facing abutment surface is disposed forward of a midline of the first drawer, and wherein the rear-facing abutment surface of the first drawer is disposed rearward of the midline of the first drawer.

B9. The desktop storage organizer of any of paragraphs B0 through B8, wherein a bottommost drawer of the plurality of drawers comprises one or more pull tabs configured to facilitate manually deploying the plurality of drawers.

B10. The desktop storage organizer of any of paragraphs B0 through B9, wherein the housing comprises a plurality of rails configured to support respective left and right edges of each drawer of the plurality of drawers.

B11. The desktop storage organizer of paragraphs B10, wherein the plurality of rails are sloped such that a front edge of each rail is higher than a rear edge of each rail, such that the drawers are biased toward remaining in the housing.

B12. The desktop storage organizer of any of paragraphs B0 through B11, wherein the housing comprises a pair of rear-facing fins configured to contact the front-facing bumper of a bottommost drawer of the plurality of drawers, such that the bottommost drawer is retained at least partially by the housing.

C0. A desktop storage organizer comprising:

a housing;

a first drawer received by the housing and including an expanse, wherein the first drawer is transitionable along a direction of travel between a stowed configuration and a deployed configuration in which the drawer is at least partially withdrawn from the housing;

a first divider coupled to the expanse and oriented along the direction of travel, the first divider including a front fin and a rear fin each extending upward;

a second drawer received by the housing, the second drawer including a first slot having a front end and a rear end defining a length of the slot, the first slot oriented along the direction of travel and configured to receive the front and rear fins, such that the first drawer and the second drawer are interlocked;

wherein the first and second drawer are configured such that transitioning the first drawer from the stowed configuration to the deployed configuration causes the front fin to contact the front end of the slot, automatically transitioning the second drawer to a deployed configuration.

C1. The desktop storage organizer of paragraph C0, wherein the front end of the first slot is disposed forward of the front fin by a first offset length when the drawers are stowed in the housing, such that the drawers are staggered by the first offset length when deployed.

C2. The desktop storage organizer of paragraph C0 or C1, wherein the first and second drawers are configured such that transitioning the first drawer from the deployed configuration to the stowed configuration causes the rear fin of the first drawer to contact the rear end of the first slot of the second drawer, causing the second drawer to transition from the deployed configuration to the stowed configuration.

C3. The desktop storage organizer of any of paragraphs C0 through C2, wherein the first drawer further comprises a second divider coupled to the expanse of the drawer and spaced apart from the first divider.

C4. The desktop storage organizer of paragraph C3, wherein the second divider and the first divider are disposed on opposite sides of a centerline of the first drawer.

C5. The desktop storage organizer of any of paragraphs C0 through C4, wherein the housing comprises a plurality of rails configured to support respective left and right edges of the first and second drawers.

C6. The desktop storage organizer of paragraph C5, wherein the plurality of rails are sloped such that a front edge of each rail is higher than a rear edge of each rail, such that the drawers are biased toward remaining in the housing.

C7. The desktop storage organizer of any of paragraphs C0 through C6, wherein the housing comprises a pair of rear-facing fins configured to contact the front-facing bumper of the first drawer, such that the first drawer is retained at least partially by the housing.

C8. The desktop storage organizer of any of paragraphs C0 through C7, wherein the first drawer further comprises one or more pull tabs, configured to facilitate manually deploying the first and second drawer.

Advantages, Features, and Benefits

The different embodiments and examples of the desktop organizer described herein provide several advantages over known solutions for storing pens and pencils. For example, illustrative embodiments and examples described herein allow visual and physical access to a wide array of markers, pens, or the like, in an organized manner.

Additionally, and among other benefits, illustrative embodiments and examples described herein store writing utensils in a horizontal configuration, which may retain ink within the tip of a felt pen, marker, or brush pen. Storing writing utensils in a horizontal configuration may prevent double-ended felt pens, markers, brush pens, and/or the like from drying out, as ink may be retained within both ends of the writing utensil.

Additionally, and among other benefits, illustrative embodiments and examples described herein provide a tiered, stepped, arrangement of drawers or shelves, each of which has a plurality of divided storage spaces for elongate writing or art utensils.

Additionally, and among other benefits, illustrative embodiments and examples described herein allow a user to open and closer (or deploy and store) all drawers at the same time, using a single manual interface.

Additionally, and among other benefits, illustrative embodiments and examples described herein allow a compact and attractive storage device for writing or art utensils.

Additionally, and among other benefits, illustrative embodiments and examples described herein ensure lower drawers are pulled out farther than higher shelves, thereby improving stability of the apparatus.

Additionally, and among other benefits, illustrative embodiments and examples described herein include slanted drawers, which bias markers stored therein toward remaining within the desktop organizer.

Additionally, and among other benefits, illustrative embodiments and examples described herein have fins and slots located within the expanse of the tray or drawer, rather than along the edges, such that forces are distributed evenly across the width of the drawer, as opposed to one side or corner.

Additionally, and among other benefits, illustrative embodiments and examples described herein include an arrangement wherein the drawer below is always "pulling" from a leading end of the drawer above. In other words, the force on the drawer is applied near a leading edge of travel, whether the drawer is being removed or inserted into the housing. This is advantageous as compared with, e.g., pushing the drawer above from the back end as it is withdrawn. Creating a pulling action results in less binding and misalignment of the drawer, because the direction of the force vector is not magnified over the length of the drawer.

Additionally, and among other benefits, illustrative embodiments and examples described herein have fins that help to prevent breakage, as the drawer insertion and withdrawal forces are in line with the length of the fin, e.g., rather than transverse to a thin protrusion or peg.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A desktop storage organizer comprising:

a housing having an open face; and a plurality of drawers disposed within the housing, each drawer comprising an expanse having a top face and an opposing bottom face;

wherein, for each of the drawers, the top face includes a front-facing abutment surface spaced from a rear-facing abutment surface and the bottom face includes a rear-facing bumper spaced from a front-facing bumper, such that the rear-facing bumper is disposed forward of a midline of the expanse and the front-facing bumper is disposed rearward of the midline;

wherein the front-facing abutment surface and the rear-facing abutment surface of each drawer extend vertically from a first divider, wherein the first divider extends at least partially along a front-to-back length of the drawer; and wherein the plurality of drawers are interlocked by the bumpers and abutment surfaces, such that transitioning a lower one of the drawers from a stowed position to a deployed position is configured to automatically pull an adjacent upper one of the drawers partially open due to interaction between the front-facing abutment surface of the lower drawer and the rear-facing bumper of the upper drawer.

2. The desktop storage organizer of claim 1, wherein the rear-facing bumper and the front-facing bumper of each drawer are defined by respective ends of a slot extending at least partially along a front-to-back length of the drawer.

3. The desktop storage organizer of claim 1, wherein the rear-facing bumper of each drawer comprises an end of a first slot, and wherein the front-facing bumper of each drawer comprises an end of a second slot.

4. The desktop storage organizer of claim 3, wherein the first slot and the second slot are colinear.

5. The desktop storage organizer of claim 1, wherein the lower one of the drawers further comprises one or more pull tabs configured to facilitate manually deploying the plurality of drawers.

6. A desktop storage organizer comprising:

a plurality of drawers disposed in a housing;

a first drawer of the plurality of drawers comprising a first divider oriented along a direction of travel of the drawer, the first divider having a front-facing abutment surface spaced apart from a rear-facing abutment surface, each of the abutment surfaces extending upward from the first divider; and a second drawer of the plurality of drawers comprising a first slot oriented along the direction of travel and configured to receive the abutment surfaces of the first divider, the first slot defining a rear-facing bumper spaced apart from a front-facing bumper, wherein the rear-facing bumper is disposed forward of a midline of the second drawer and the front-facing bumper is disposed rearward of the midline of the second drawer;

wherein the first drawer and the second drawer are interlocked by the first divider and the first slot, such that transitioning the first drawer between a stowed and a deployed configuration along the direction of travel causes the second drawer to transition between a stowed and a deployed configuration; and wherein the rear-facing bumper is spaced from the front-facing abutment surface by an offset distance when the first drawer is stowed, such that the drawers are staggered by the offset distance when the first drawer is deployed.

7. The desktop storage organizer of claim 6, wherein the plurality of drawers are configured such that transitioning the first drawer between the stowed configuration and the deployed configuration causes the front-facing abutment surface to contact the rear-facing bumper of the first slot, such that the first drawer pulls the second drawer along the direction of travel.

8. The desktop storage organizer of claim 6, wherein the first drawer is disposed beneath the second drawer, such that the first drawer extends beyond the second drawer by the offset distance when in the deployed configuration.

9. The desktop storage organizer of claim 6, wherein the first drawer further comprises a second divider oriented parallel to the first divider, and wherein the second divider further comprises a second front-facing abutment surface spaced apart from a second rear-facing abutment surface, each of the abutment surfaces extending upward from the second divider.

10. The desktop storage organizer of claim 9, wherein the second drawer further comprises a second slot oriented parallel to the first slot and configured to receive the abutment surfaces of the second divider, the second slot having a second rear-facing bumper spaced apart from a second front-facing bumper.

11. The desktop storage organizer of claim 9, wherein the first divider and the second divider separate the first drawer into at least a first storage area, a second storage area, and a third storage area.

12. The desktop storage organizer of claim 9, wherein the first divider and the second divider are disposed on opposite sides of a centerline of the first drawer.

13. The desktop storage organizer of claim 6, wherein the housing comprises a plurality of rails configured to support respective left and right edges of the first and second drawers.

14. The desktop storage organizer of claim 6, wherein the front-facing abutment surface is disposed forward of a midline of the first drawer, and wherein the rear-facing abutment surface of the first drawer is disposed rearward of the midline of the first drawer.

15. A desktop storage organizer comprising:

a housing;

a first drawer received by the housing and including an expanse, wherein the first drawer is transitionable along a direction of travel between a stowed configuration and a deployed configuration in which the drawer is at least partially withdrawn from the housing;

a first divider coupled to the expanse and oriented along the direction of travel, the first divider including a front fin and a rear fin each extending upward; and a second drawer received by the housing, the second drawer including a first slot having a front end and a rear end defining a length of the slot, the first slot oriented along the direction of travel and configured to receive the front and rear fins, such that the first drawer and the second drawer are interlocked;

wherein the first and second drawer are configured such that transitioning the first drawer from the stowed configuration to the deployed configuration causes the front fin to contact the front end of the slot, automatically transitioning the second drawer to a deployed configuration.

16. The desktop storage organizer of claim 15, wherein the front end of the first slot is disposed forward of the front fin by a first offset length when the drawers are stowed in the housing, such that the drawers are staggered by the first offset length when deployed.

17. The desktop storage organizer of claim 15, wherein the first and second drawers are configured such that transitioning the first drawer from the deployed configuration to the stowed configuration causes the rear fin of the first drawer to contact the rear end of the first slot of the second drawer, causing the second drawer to transition from the deployed configuration to the stowed configuration.

18. The desktop storage organizer of claim 15, wherein the first drawer further comprises a second divider coupled to the expanse of the drawer and spaced apart from the first divider.

19. The desktop storage organizer of claim 18, wherein the second divider and the first divider are disposed on opposite sides of a centerline of the first drawer.

20. A desktop storage organizer comprising:

a housing having an open face; and a plurality of drawers disposed within the housing, each drawer comprising an expanse having a top face and an opposing bottom face;

wherein, for each of the drawers, the top face includes a front-facing abutment surface spaced from a rear-facing abutment surface and the bottom face includes a rear-facing bumper spaced from a front-facing bumper, such that the rear-facing bumper is disposed forward of a midline of the expanse and the front-facing bumper is disposed rearward of the midline;

wherein the rear-facing bumper of each drawer comprises an end of a first slot, and wherein the front-facing bumper of each drawer comprises an end of a second slot; and wherein the plurality of drawers are interlocked by the bumpers and abutment surfaces, such that transitioning a lower one of the drawers from a stowed position to a deployed position is configured to automatically pull an adjacent upper one of the drawers partially open due to interaction between the front-facing abutment surface of the lower drawer and the rear-facing bumper of the upper drawer.

* * * * *